Jan. 29, 1963  F. G. McCLESKEY  3,075,508
AIR PREHEATING ASSEMBLY FOR USE UPON CARBURETORS
OF INTERNAL COMBUSTION ENGINES
Filed Dec. 6, 1961

INVENTOR.
FRANK G. McCLESKEY

BY
Dunlap, Laney & Hubbard
ATTORNEYS

United States Patent Office 3,075,508
Patented Jan. 29, 1963

3,075,508
AIR PREHEATING ASSEMBLY FOR USE UPON CARBURETORS OF INTERNAL COMBUSTION ENGINES
Frank G. McCleskey, 2328 NW. 1st St. Terrace, Oklahoma City, Okla.
Filed Dec. 6, 1961, Ser. No. 157,602
8 Claims. (Cl. 123—122)

This invention relates to an assembly for preheating the air fed to the carburetor of an internal combustion engine.

It is well known that preheating of the air supplied to the carburetor of an internal combustion engine results in improved carburetion of the air, and in enhanced efficiency of the engine. A number of previous systems have been devised for effecting the warming of air introduced to the carburetor, and such systems have generally been alleged to improve substantially the fuel mileage which is obtainable with the internal combustion engine upon which such preheating devices are used.

In general, the air preheating devices with which I am familiar have provided an air intake scoop located, in most instances, adjacent the radiator of the automobile or the like, or in other locations where a readily accessible air supply is available. A conduit is connected to such air scoop and passes in heat exchange relation to the exhaust manifold of the engine before conducting the air passing through the conduit into the carburetor. In this way, air is heated by passing in close proximity to the exhaust manifold prior to entering the carburetor. A disadvantage which characterizes such previous preheating systems is the tendency of the system to introduce an unusually large amount of dust, grit and other deleterious materials to the carburetor by entrainment in the air stream directed thereto. This has been due to the high velocity of the stream of air directed through the preheating system to the carburetor. The high velocity of the air stream is, in turn, due to the relatively small cross-sectional area of the conduits which are utilized. This cross-sectional area is necessarily limited when a single intake conduit is employed as has been the case in practically all of such previous devices. When the single conduit, high velocity, air preheating systems are employed, it has been necessary to use a rather elaborate filtering system upon the carburetor of the engine in order to insure that all dust and other deleterious substances have been removed from the air stream before its introduction into the carburetor.

Another disadvantage accruing from the use of intake conduits of limited cross-sectional area is the relative inefficiency of the heating which occurs. In other words, the air rushes at high velocity through the air scoop and through the conduit to the carburetor before it has had a chance to be adequately warmed in passing adjacent the exhaust manifold.

The present invention provides a novel system for preheating the air directed to the carburetor of an internal combustion engine. At least two significant improvements are realized as a result of a structure employed in the air preheating system of the invention. The first of these is a more efficient preheating of the air directed to the carburetor by the use of the exhaust manifolds of the internal combustion engine. This improved efficiency is achieved by having the opening through which the air supply is drawn into the air conduits leading to the carburetor disposed immediately over the exhaust manifold of the engine. Moreover, the diameter of the openings into the air conduits are of a size no larger than the diameter of the exhaust manifold so that only warm air over and surrounding the exhaust manifold enters the air feed conduits.

The second improvement which is effected by the present invention is the reduction in the amount of lint, dust and other deleterious substances which are sucked through the air conduits of the system into the carburetor, thus eliminating the requirement of an elaborate filtration system. The elimination or reduction of the undesirable entrainment of such deleterious substances is accomplished by providing a plurality of air intake conduits leading to a large air reservoir attached to the air intake port of the carburetor. Each of the air intake conduits leading to the air reservoir is of maximum possible diameter consistent with the requirement that the openings at the end of the conduits be no larger than the diameter of the exhaust manifold so that all of the conduits together have a much greater combined cross-sectional area than any of the types of air conduits used in previous preheating systems. With the increase in this cross-sectional area, the volume of air which may flow into the air reservoir in a given interval of time is much greater, and therefore the velocity of the air entering the air reservoir, and subsequently the carburetor will be substantially reduced. The reduction in the velocity of the air entering the air reservoir is then responsible for a corresponding reduction in the amount of lint and dust which are entrained in the air stream entering the reservoir and the carburetor.

As a further feature of the invention aiding in reducing the quantity of dust and other foreign materials entering the carburetor, the several conduits which bring the heated air from the vicinity of the exhaust manifold to the air reservoir are positioned around the reservoir in such a way that air entering the reservoir from the conduits on one side thereof tends to collide with the air entering the reservoir from conduits on the opposite side thereof. This further reduces the velocity in the air sucked into the carburetor and tends to permit any dust or solid particles which might be entrained in the air to be precipitated out of the air stream in the air reservoir and before entering the carburetor.

From the foregoing discussion it will be apaprent that the present invention provides an air preheating system for preheating air introduced to the carburetor of an internal combustion engine in a more efficient manner than previous air preheating systems.

Another object of the present invention is to provide an air preheating system for use in preheating the air introduced to the carburetor of an internal combustion engine, which air preheating system functions to prevent the entrainment of any substantial quantities of dust, lint or other deleterious materials in the air streams which are preheated and directed to the carburetor.

A further object of the present invention is to provide a system for preheating the air which is introduced to the carburetor of an internal combustion engine, which system is simple and economical in structure, and is characterized by a long and trouble-free operating life.

Other objects and advantages of the invention will become apparent as the following description proceeds and is read in conjunction with a perusal of the accompanying drawings which illustrate my invention.

Figure 1:
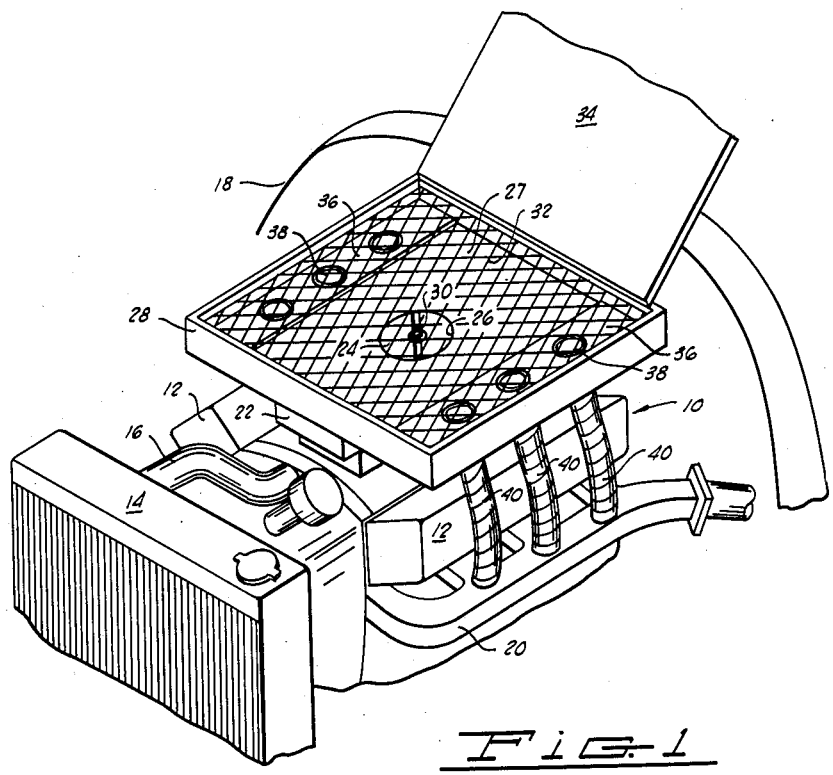
FIGURE 1 is a perspective view of the front portion of an automobile from which the hood has been removed to show the internal combustion engine and the manner in which the present invention is associated therewith.

Referring now to the drawings in detail, and in particular to FIGURE 1, an internal combustion engine of the type generally utilized in automobiles is designated by reference character 10. The particular type of internal combustion engine illustrated is a so-called "V-8" engine having dual banks of cylinders 12 positioned on opposite sides of the engine. The radiator 14, water hose 16 and chassis fire wall 18 usually associated with such engines are also illustrated in FIGURE 1. Extending rearwardly along the engine 10 on opposite sides thereof is an exhaust manifold 20, only one of which is visible in FIGURE 1, and both of which may be viewed in FIGURE 2.

Mounted on top of the engine 10 is a conventional carburetor 22 of the usual type which is provided for atomizing the fuel and mixing the atomized fuel with an air stream. The air intake opening of the carburetor is designated by reference character 24 and projects upwardly into a circular opening 26 formed in the bottom plate 27 of a large, hermetically sealed air reservoir 28 which rests on top of the carburetor 22 and is supported thereby. Although I am not aware of the theoretical explanation for the improved result which is obtained, I have found that a vast improvement in the efficiency of the internal combustion engine is obtained when the air reservoir has a cross-sectional area (as measured in a plane extending normal to the air intake opening of the carburetor) which is at least four times the cross-sectional area of the air intake openings.

Figure 2:
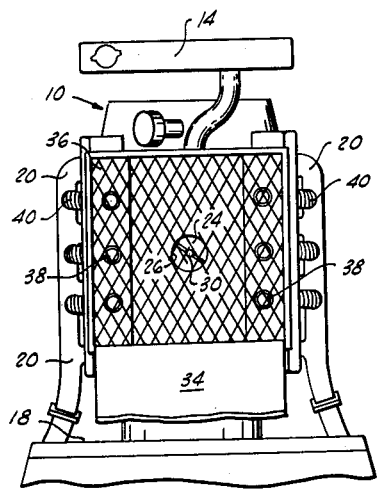
FIGURE 2 is a plan view of the present invention in association with an internal combustion engine of the type illustrated in FIGURE 1.

In the preferred embodiment illustrated in FIGURES 1 and 2, the air reservoir 28 is of rectangular configuration and is constructed of an insulating material such as asbestos board. The circular aperture 26 formed in the bottom 27 of the air reservoir 28 is equal to or slightly less than the diameter of the air intake opening 24 of the carburetor so that a tight frictional fit obtains between the wall of the air intake opening 24 of the carburetor and the bottom plate 27 of the air reservoir. As is well known in the art, a long threaded bolt 30 extends upwardly in the air intake opening of the carburetor in a concentric position. The upper end of the bolt 30 is secured to a grill or screen 32 which extends across the top of the air reservoir 28. A cover 34 is hingedly attached to one side of the rectangular air reservoir 28, and may be closed across the top of the reservoir to prevent the exposure of the interior of the reservoir to infiltration by dust, grease or other deleterious materials.

A pair of flat elongated asbestos plates 36 are superimposed upon the bottom plate 27 of the reservoir 28 and extend parallel to each other along the opposite sides of the reservoir. Each of the plates 36 is provided with a plurality of longitudinally spaced, circular apertures 38 each of which overlies an identical aperture formed in the bottom of the reservoir. The apertures 38 are each of a diameter slightly larger than the diameter or transverse dimension of the exhaust manifolds 20.

On opposite sides of the air reservoir 28, a plurality of air intake ducts 40 corresponding in number to the number of the apertures 38 communicate with the interior of the air reservoir 28 and are secured at their upper ends by tight frictional engagement with the apertures 38 in the abestos plates 36. Each of the air intake ducts 40 has approximately the same diametric size as the largest transverse dimension of its respective exhaust manifold 20. Additionally, the length of each of the ducts 40 is such that each duct terminates at its lower end in close proximity to the upper surface of the respective exhaust manifold 20. Additionally, the length of each of the ducts 40 is such that each duct terminates at its lower end in close proximity to the upper surface of the respective exhaust manifold 20. Although a variety of materials of construction may be utilized in the manufacture of the ducts 40, I prefer to employ metallic tubular members which are sufficiently flexible to permit intentional rearrangement when desired, but yet possess sufficient rigidity to retain their positions over the exhaust manifolds despite the engine vibration and road shock customarily experienced in the operation of automobiles.

*Operation*

In the operation of the air preheating system of the present invention, the air reservoir 28 is first attached to the air intake opening 24 of the carburetor 22 by frictional engagement between the circular aperture 26 in the bottom of the reservoir 28 with the air intake opening 24, and by securing the upper end of the bolt 30 to the grill 32 at the top of the air reservoir. The hinged top 34 of the reservoir 28 is then closed to prevent the access of any foreign materials to the interior of the reservoir. Each of the several air intake ducts 40 is then bent to a position such that its lower end is immediately over, and in juxtaposition to its respective exhaust manifold 20. The air preheating system of the present invention is now in its functional or operational position.

As the automobile is powered, the hot exhaust gases discharged from the internal combustion engine 10 are passed through the exhaust manifolds 20 and soon heat these manifolds to a temperature which is substantially above the ambient temperatures outside the hood of the automobile. In turn, the air immediately adjacent the exhaust manifolds 20 is heated to a substantially elevated temperature. The suction developed by the carburetor 22 then acts through the air reservoir 28 and the air intake ducts 40 to drawn the heated air surrounding the exhaust manifolds 20 into the air reservoir 28.

Since there are a plurality of the air intake ducts 40, and since each of these ducts are made no smaller than the maximum transverse dimension of the exhaust manifold 20, a maximum cross-sectional area of air intake ducting is provided consistent with the desirable feature of limiting the diameter of each duct to a size such that only the air which has been heated to the maximum extent by the exhaust manifolds 20 will be inducted thereinto. The enlarged cross-sectional area in turn assures that the maximum velocity of the air flowing through any one of the air intake ducts 40 will not be of sufficient magnitude to result in the entrainment of any considerable amount of dust, grit, grease or other deleterious materials in the air stream being carried to the air reservoir 28 by the ducts 40.

It will be noted that the air intake ducts 40 are equally distributed on opposite sides of the air reservoir 28. Since the air intake opening 24 of the carburetor 22 is positioned centrally between the several air intake ducts 40, air will rush into the air reservoir 28 from the ducts 40 in opposite directions. The moving air currents inside the reservoir 28 therefore collide with each other and tend to reduce the velocity of the air stream flowing through the ducts 40 on each side of the reservoir. Moreover, the turbulence created inside the air reservoir 28 tends to effect some settling out, or filtering of such particles of dust and other deleterious materials as may be entrained in the inducted air streams.

Although it is generally not necessary to do so, a filter similar to the type customarily used on the air intake opening 24 of internal combustion engine carburetors may be placed inside the air reservoir 28 and around the air intake opening 24 if desired. I have found, however, that the present invention reduces the velocity of incoming air to such an extent that the introduction of deleterious substances to the interior of the carburetor does not pose any substantial problem even in the absence of such a filter.

From the foregoing description, it will be apparent that the present invention provides an improved system for inducting preheated air into the carburetor of an internal combustion engine. Maximum preheating is obtained with a substantial reduction in the quantity of grit, dust and other deleterious materials which enter the carburetor and must be filtered from the air streams before entering the carburetor.

Although various changes and innovations in the structure depicted in the accompanying drawings and described hereinbefore will be apparent to those skilled in the art, it is the contemplation of the inventor that such changes and innovations shall be considered to be encompassed within the spirit and scope of the present invention so long as there is no departure from the basic principles underlying the invention and herein described for the first time.

What is claimed is:

1. A preheating assembly for preheating the air fed to a carburetor in an internal combustion engine comprising an insulated air reservoir attached to the air intake opening of the carburetor; and at least one hot air duct communicating with the interior of said reservoir and extending into proximity to the exhaust manifold of said engine for conveying air warmed by said exhaust manifold into said reservoir for supply to said carburetor.

2. A preheating assembly as claimed in claim 1 wherein said reservoir is constructed of asbestos board and is heremetically sealed.

3. A preheating assembly as claimed in claim 1 wherein the air intake opening of said carburetor is attached to said reservoir at the center of the bottom thereof, and an equal number of said ducts communicate with the interior of said reservoir on opposite sides of said carburetor air intake opening.

4. A preheating assembly as claimed in claim 1 wherein said ducts are of a length to extend from said reservoir to said exhaust manifold and have an inside diameter approximately equal to the outside diameter of said exhaust manifold whereby a maximum quantity of warm air heated by said exhaust manifold will be conveyed to said reservoir at a minimum velocity by said ducts.

5. A preheating assembly as claimed in claim 1 wherein said air reservoir has a cross-sectional area in a plane extending normal to said air intake opening which is at least four times the cross-sectional area of said air intake opening.

6. A preheating assembly as claimed in claim 4 wherein the air intake opening of said carburetor is attached to said reservoir at the center of the bottom thereof; and wherein there are six of said ducts, three of which communicate with the interior of said reservoir on the opposite side of said carburetor air intake opening from the remaining three.

7. In combination, an internal combustion engine having a carburetor and an exhaust manifold; an insulated air reservoir attached to the air intake opening of the carburetor; and a plurality of hot air ducts communicating with the interior of said reservoir at one of their ends and extending into proximity to said exhaust manifold at their other ends.

8. A preheating assembly as claimed in claim 7, wherein said ducts have an inner diameter approximately equal to the outside diameter of said exhaust manifold whereby a maximum quantity of warm air heated by said exhaust manifold will be conveyed to said reservoir at a minimum velocity by said ducts.

No references cited.